United States Patent
Qin et al.

(10) Patent No.: US 11,139,945 B2
(45) Date of Patent: Oct. 5, 2021

(54) COMMUNICATION METHOD, TERMINAL, AND NETWORK DEVICE FOR DETERMINING A BEAM FOR AN UPLINK CHANNEL

(71) Applicant: Huawei Technologies Co., Ltd., Shenzhen (CN)

(72) Inventors: Yi Qin, Kista (SE); Zhongfeng Li, Shanghai (CN); Shengyue Dou, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/714,165

(22) Filed: Dec. 13, 2019

(65) Prior Publication Data

US 2020/0119899 A1 Apr. 16, 2020

Related U.S. Application Data

(63) Continuation of application No. PCT/CN2018/091496, filed on Jun. 15, 2018.

(30) Foreign Application Priority Data

Jun. 16, 2017 (CN) .......................... 201710459702.X

(51) Int. Cl.
*H04W 76/11* (2018.01)
*H04L 5/10* (2006.01)
(Continued)

(52) U.S. Cl.
CPC .............. *H04L 5/10* (2013.01); *H04L 5/0051* (2013.01); *H04W 72/042* (2013.01); *H04W 76/11* (2018.02)

(58) Field of Classification Search
CPC ............... H04W 76/11; H04W 72/042; H04W 72/1289; H04W 72/1268; H04L 5/10; H04L 5/0053; H04L 5/0051
See application file for complete search history.

(56) References Cited

U.S. PATENT DOCUMENTS 9,729,295 B2 * 8/2017 Zhang ................... H04L 5/0053
2013/0102345 A1   4/2013 Jung
(Continued)

FOREIGN PATENT DOCUMENTS

CN    103891161 A    6/2014
CN    106105073 A    11/2016
(Continued)

OTHER PUBLICATIONS

"UL beam management for NR MIMO," 3GPP TSG RAN WG1 Meeting #89, Hangzhou, P.R. China, R1-1707120, pp. 1-6, 3rd Generation Partnership Project, Valbonne, France (May 15-19, 2017).
(Continued)

*Primary Examiner* — Wei Zhao
(74) *Attorney, Agent, or Firm* — Leydig, Voit & Mayer, Ltd.

(57) ABSTRACT

This application provides a communication method, a terminal, and a network device. The method includes: receiving, by a terminal, indication information from a network device, where the indication information includes an identifier of at least one reference signal; and determining, by the terminal, that there is a correspondence between a resource used to send a first channel and a first reference signal of the at least one reference signal, where the first channel is a channel to be transmitted by the terminal, and there is a spatial quasi co-location (QCL) relationship between a port of the first channel and a port of the first reference signal, or there is a spatial QCL relationship between a port of a
(Continued)

demodulation reference signal of the first channel and a port of the first reference signal.

15 Claims, 4 Drawing Sheets

(51) Int. Cl.
*H04L 5/00* (2006.01)
*H04W 72/04* (2009.01)

(56) References Cited

U.S. PATENT DOCUMENTS

| | | | |
|---|---|---|---|
| 2013/0294318 A1* | 11/2013 | Amerga | H04W 4/06 370/312 |
| 2017/0078955 A1 | 3/2017 | Cheng et al. | |
| 2020/0059951 A1* | 2/2020 | Frenne | H04L 5/0023 |

FOREIGN PATENT DOCUMENTS

| | | |
|---|---|---|
| CN | 107734559 A | 2/2018 |
| CN | 106851826 B | 10/2019 |
| CN | 106416401 B | 11/2019 |
| CN | 106465211 B | 1/2020 |
| WO | 2017078464 A1 | 5/2017 |

OTHER PUBLICATIONS

"BPL definition and Spatial QCL time indication," 3GPP TSG RAN WG1#89, Hangzhou, P.R. China, R1-1708906, pp. 1-6, 3rd Generation Partnership Project, Valbonne, France (May 15-19, 2017).

"UL beam management," 3GPP TSG RAN WG1 Meeting #89, Hangzhou, China, R1-1706925, pp. 1-6, 3rd Generation Partnership Project, Valbonne, France (May 15-19, 2017).

* cited by examiner

COMMUNICATION METHOD, TERMINAL, AND NETWORK DEVICE FOR DETERMINING A BEAM FOR AN UPLINK CHANNEL

CROSS-REFERENCE TO RELATED APPLICATIONS

This application is a continuation of International Application No. PCT/CN2018/091496, filed on Jun. 15, 2018, which claims priority to Chinese Patent Application No. 201710459702.X, filed on Jun. 16, 2017. The disclosures of the aforementioned applications are hereby incorporated by reference in their entireties.

TECHNICAL FIELD

This application relates to the communications field, and more specifically, to a communication method, a terminal, and a network device.

BACKGROUND

Beamforming is a signal preprocessing technology based on an antenna array. In beamforming, a directional beam is generated by adjusting a weighting coefficient of each array element in the antenna array, to obtain an obvious array gain. Therefore, a beamforming technology has great advantages in aspects such as expanding a coverage area, improving an edge throughput, and suppressing interference.

In long-term evolution (LTE) communications system, a network device can improve coverage during downlink transmission by using the beamforming technology. However, in an uplink transmission process, the LTE system does not support the beamforming technology. In other words, a terminal cannot send an uplink signal in the uplink transmission process by using different beams. With development of technologies, to improve coverage during uplink transmission, the beamforming technology is also introduced on a terminal side in a new radio (NR) communications system. To be specific, the terminal can improve coverage during downlink transmission by using the beamforming technology, that is, transmits an uplink signal by using different beams.

However, in a downlink transmission process, although the terminal can send an uplink channel by using different beams, the terminal may determine, only in a specific scenario, a beam used to send an uplink channel. Therefore, a technical means is urgently needed to help the terminal determine, in most communication scenarios, a beam used to send an uplink channel.

SUMMARY

This application provides a communication method and a terminal, so that the terminal determines a beam used to send a first channel, to improve uplink coverage.

According to a first aspect, a communication method is provided. The method includes:

receiving, by a terminal, indication information from a network device, where the indication information includes an identifier of at least one reference signal; and determining, by the terminal, that there is a correspondence between a resource used to send a first channel and a first reference signal of the at least one reference signal, where the first channel is a channel to be transmitted by the terminal, and there is a spatial quasi co-location (QCL) relationship between a port of the first channel and a port of the first reference signal, or there is a spatial QCL relationship between a port of a demodulation reference signal (DMRS) of the first channel and a port of the first reference signal.

Optionally, the port in this embodiment of this application may be an antenna port. The port of the first channel may be a port used to send the first channel, and the port of the first reference signal may be a port used to transmit the first reference signal.

In this embodiment of this application, the terminal may determine, based on the correspondence between the resource used to send the first channel and the reference signal, the reference signal whose port has the spatial QCL relationship with the port of the first channel, and further determine a beam used by the terminal to send the first channel. In the method, the beam used by the terminal to send the first channel is determined based on the correspondence. Therefore, the method may be applicable to a scenario with beam reciprocity and/or a scenario without beam reciprocity.

Alternatively, the method includes:

receiving, by a terminal, indication information from a network device, where the indication information includes an identifier of at least one reference signal, there is a correspondence between a resource used to send a to-be-sent first channel by the terminal and a first reference signal of the at least one reference signal, and there is a QCL relationship between a port of the to-be-sent first channel and a port of the first reference signal, or there is a QCL relationship between a port of a DMRS of the to-be-sent first channel and a port of the first reference signal; and determining, by the terminal, the first reference signal based on the correspondence.

With reference to the first aspect, in a possible implementation of the first aspect, the determining, by the terminal, that there is a correspondence between a resource used to send a first channel and a first reference signal of the at least one reference signal includes:

determining, by the terminal based on a correspondence between the first reference signal and a time-frequency resource used to transmit a second channel and a correspondence between the resource used to transmit the second channel and the resource used to send the first channel, that there is a correspondence between the resource used to send the first channel and the first reference signal, where the second channel is a channel used to transmit downlink control information (DCI).

In this embodiment of this application, a method in which the terminal determines that there is the correspondence between the resource used to send the first channel and the first reference signal, and then determines the beam used to send the first channel may be applicable to a scenario in which the terminal receives a channel carrying DCI.

With reference to the first aspect, in a possible implementation of the first aspect, the determining, by the terminal, that there is a correspondence between a resource used to send a first channel and a first reference signal of the at least one reference signal includes:

determining, by the terminal based on a correspondence between the first reference signal and a reporting configuration of a reference signal used to measure channel state information (CSI), and the resource that is of the first channel and that is configured in the reporting configuration of the reference signal used to measure the CSI, that there is the correspondence between the resource used to send the first channel and the first reference signal.

In this embodiment of this application, a method in which the terminal determines that there is the correspondence between the resource used to send the first channel and the first reference signal, and then determines the beam used to send the first channel may be applicable to a scenario in which the terminal receives reporting configuration information of the reference signal used to measure the CSI.

With reference to the first aspect, in a possible implementation of the first aspect, the determining, by the terminal, that there is a correspondence between a resource used to send a first channel and a first reference signal of the at least one reference signal includes:

determining, by the terminal based on a correspondence between the first reference signal and a first cell identifier and a correspondence between the first cell identifier and the resource used to send the first channel, that there is the correspondence between the resource used to send the first channel and the first reference signal.

In this embodiment of this application, a method in which the terminal determines that there is the correspondence between the resource used to send the first channel and the first reference signal, and then determines the beam used to send the first channel may be applicable to a scenario in which the terminal obtains a cell identifier.

With reference to the first aspect, in a possible implementation of the first aspect, the determining, by the terminal, that there is a correspondence between a resource used to send a first channel and a first reference signal of the at least one reference signal includes:

determining, by the terminal based on a correspondence between the first reference signal and an uplink control information (UCI) type and a correspondence between an UCI type carried on the first channel and the resource used to send the first channel, that there is the correspondence between the resource used to send the first channel and the first reference signal.

In this embodiment of this application, a method in which the terminal determines that there is the correspondence between the resource used to send the first channel and the first reference signal, and then determines the beam used to send the first channel may be applicable to a scenario in which the terminal receives UCI.

With reference to the first aspect, in a possible implementation of the first aspect, the determining, by the terminal, that there is a correspondence between a resource used to send a first channel and a first reference signal of the at least one reference signal includes:

determining, by the terminal based on the resource used to send the first channel and a correspondence between the first reference signal and a resource used to send a channel by the terminal, that there is the correspondence between the resource used to send the first channel and the first reference signal.

In this embodiment of this application, a method in which the terminal determines that there is the correspondence between the resource used to send the first channel and the first reference signal, and then determines the beam used to send the first channel may be applicable to a scenario in which the terminal receives the first reference signal.

With reference to the first aspect, in a possible implementation of the first aspect, the method further includes: receiving, by the terminal, configuration information sent by the network device, where the configuration information is used to instruct the terminal to determine a valid time of the first reference signal based on the indication information.

According to a second aspect, a communication method is provided. The method includes:

generating, by a network device, indication information, where the indication information includes an identifier of at least one reference signal; and sending, by the network device, the indication information to a terminal, so that the terminal determines that there is a correspondence between a resource used to send a first channel and a first reference signal of the at least one reference signal, where the first channel is a channel to be transmitted by the terminal, and there is a spatial QCL relationship between a port of the first channel and a port of the first reference signal, or there is a spatial QCL relationship between a port of a DMRS of the first channel and a port of the first reference signal.

In this embodiment of this application, the terminal may determine, based on the correspondence between the resource used to send the first channel and the reference signal, the reference signal whose port has the spatial QCL relationship with the port of the first channel, and further determine a beam used by the terminal to send the first channel. In the method, the beam used by the terminal to send the first channel is determined based on the correspondence. Therefore, the method may be applicable to a scenario with beam reciprocity and/or a scenario without beam reciprocity.

With reference to the second aspect, in a possible implementation of the second aspect, the method further includes:

sending, by the network device to the terminal, a correspondence between the first reference signal and a time-frequency resource used to transmit a second channel, where the second channel is a channel used to transmit DCI.

In an optional implementation, the network device may alternatively send indication information, to indicate the correspondence.

In this embodiment of this application, a method in which the terminal determines that there is the correspondence between the resource used to send the first channel and the first reference signal, and then determines the beam used to send the first channel may be applicable to a scenario in which the terminal receives a channel carrying DCI.

With reference to the second aspect, in a possible implementation of the second aspect, the method includes:

sending, by the network device to the terminal, a correspondence between the first reference signal and a reporting configuration of a reference signal used to measure CSI.

In an optional implementation, the network device may alternatively send indication information, to indicate the correspondence.

In this embodiment of this application, a method in which the terminal determines that there is the correspondence between the resource used to send the first channel and the first reference signal, and then determines the beam used to send the first channel may be applicable to a scenario in which the terminal receives reporting configuration information of the reference signal used to measure the CSI.

With reference to the second aspect, in a possible implementation of the second aspect, the method further includes:

sending, by the network device, a correspondence between the first reference signal and a first cell identifier to the terminal.

In an optional implementation, the network device may alternatively send indication information, to indicate the correspondence.

In this embodiment of this application, a method in which the terminal determines that there is the correspondence between the resource used to send the first channel and the first reference signal, and then determines the beam used to send the first channel may be applicable to a scenario in which the terminal obtains a cell identifier.

With reference to the second aspect, in a possible implementation of the second aspect, the method further includes:

sending, by the network device, a correspondence between the first reference signal and an UCI type to the terminal.

In an optional implementation, the network device may alternatively send indication information, to indicate the correspondence.

In this embodiment of this application, a method in which the terminal determines that there is the correspondence between the resource used to send the first channel and the first reference signal, and then determines the beam used to send the first channel may be applicable to a scenario in which the terminal receives UCI.

With reference to the second aspect, in a possible implementation of the second aspect, the method further includes:

sending, by the network device to the terminal, a correspondence between the first reference signal and a resource used to send a channel by the terminal.

In an optional implementation, the network device may alternatively send indication information, to indicate the correspondence.

In this embodiment of this application, a method in which the terminal determines that there is the correspondence between the resource used to send the first channel and the first reference signal, and then determines the beam used to send the first channel may be applicable to a scenario in which the terminal receives the first reference signal.

According to a third aspect, a terminal is provided. The terminal includes:

a transceiver, configured to receive indication information from a network device, where the indication information includes an identifier of at least one reference signal; and a processor, configured to determine that there is a correspondence between a resource used to send a first channel and a first reference signal of the at least one reference signal, where the first channel is a channel to be transmitted by the terminal, and there is a spatial QCL relationship between a port of the first channel and a port of the first reference signal, or there is a spatial QCL relationship between a port of a DMRS of the first channel and a port of the first reference signal.

In this embodiment of this application, the terminal may determine, based on the correspondence between the resource used to send the first channel and the reference signal, the reference signal whose port has the spatial QCL relationship with the port of the first channel, and further determine a beam used by the terminal to send the first channel. In the method, the beam used by the terminal to send the first channel is determined based on the correspondence. Therefore, the method may be applicable to a scenario with beam reciprocity and/or a scenario without beam reciprocity.

With reference to the third aspect, in a possible implementation of the third aspect, the processor is further configured to:

determine, based on a correspondence between the first reference signal and a time-frequency resource used to transmit a second channel and a correspondence between the resource used to transmit the second channel and the resource used to send the first channel, that there is a correspondence between the resource used to send the first channel and the first reference signal, where the second channel is a channel used to transmit DCI.

In this embodiment of this application, a method in which the terminal determines that there is the correspondence between the resource used to send the first channel and the first reference signal, and then determines the beam used to send the first channel may be applicable to a scenario in which the terminal receives a channel carrying DCI.

With reference to the third aspect, in a possible implementation of the third aspect, the processor is further configured to:

determine, based on a correspondence between the first reference signal and a reporting configuration of a reference signal used to measure CSI, and the resource that is of the first channel and that is configured in the reporting configuration of the reference signal used to measure the CSI, that there is the correspondence between the resource used to send the first channel and the first reference signal.

In this embodiment of this application, a method in which the terminal determines that there is the correspondence between the resource used to send the first channel and the first reference signal, and then determines the beam used to send the first channel may be applicable to a scenario in which the terminal receives reporting configuration information of the reference signal used to measure the CSI.

With reference to the third aspect, in a possible implementation of the third aspect, the processor is further configured to:

determine, based on a correspondence between the first reference signal and a first cell identifier and a correspondence between the first cell identifier and the resource used to send the first channel, that there is the correspondence between the resource used to send the first channel and the first reference signal.

In this embodiment of this application, a method in which the terminal determines that there is the correspondence between the resource used to send the first channel and the first reference signal, and then determines the beam used to send the first channel may be applicable to a scenario in which the terminal obtains a cell identifier.

With reference to the third aspect, in a possible implementation of the third aspect, the processor is further configured to:

determine, based on a correspondence between the first reference signal and an UCI type and a correspondence between an UCI type carried on the first channel and the resource used to send the first channel, that there is the correspondence between the resource used to send the first channel and the first reference signal.

In this embodiment of this application, a method in which the terminal determines that there is the correspondence between the resource used to send the first channel and the first reference signal, and then determines the beam used to send the first channel may be applicable to a scenario in which the terminal receives UCI.

With reference to the third aspect, in a possible implementation of the third aspect, the processor is further configured to:

determine, based on the resource used to send the first channel and a correspondence between the first reference signal and a resource used to send a channel by the terminal, that there is the correspondence between the resource used to send the first channel and the first reference signal.

In this embodiment of this application, a method in which the terminal determines that there is the correspondence between the resource used to send the first channel and the first reference signal, and then determines the beam used to send the first channel may be applicable to a scenario in which the terminal receives the first reference signal.

According to a fourth aspect, a network device is provided. The network device includes:

a processor, configured to generate indication information, where the indication information includes an identifier of at least one reference signal; and a transceiver, configured to send the indication information to a terminal, so that the terminal determines that there is a correspondence between a resource used to send a first channel and a first reference signal of the at least one reference signal, where the first channel is a channel to be transmitted by the terminal, and there is a spatial QCL relationship between a port of the first channel and a port of the first reference signal, or there is a spatial QCL relationship between a port of a DMRS of the first channel and a port of the first reference signal.

In this embodiment of this application, the terminal may determine, based on the correspondence between the resource used to send the first channel and the reference signal, the reference signal whose port has the spatial QCL relationship with the port of the first channel, and further determine a beam used by the terminal to send the first channel. In the method, the beam used by the terminal to send the first channel is determined based on the correspondence. Therefore, the method may be applicable to a scenario with beam reciprocity and/or a scenario without beam reciprocity.

With reference to the fourth aspect, in a possible implementation of the fourth aspect, the transceiver is further configured to:

send, to the terminal, a correspondence between the first reference signal and a time-frequency resource used to transmit a second channel, where the second channel is a channel used to transmit DCI.

In an optional implementation, the transceiver may alternatively be configured to send indication information, to indicate the correspondence.

In this embodiment of this application, a method in which the terminal determines that there is the correspondence between the resource used to send the first channel and the first reference signal, and then determines the beam used to send the first channel may be applicable to a scenario in which the terminal receives a channel carrying DCI.

With reference to the fourth aspect, in a possible implementation of the fourth aspect, the transceiver is further configured to:

send, to the terminal, a correspondence between the first reference signal and a reporting configuration of a reference signal used to measure CSI.

In an optional implementation, the transceiver may alternatively be configured to send indication information, to indicate the correspondence.

In this embodiment of this application, a method in which the terminal determines that there is the correspondence between the resource used to send the first channel and the first reference signal, and then determines the beam used to send the first channel may be applicable to a scenario in which the terminal receives reporting configuration information of the reference signal used to measure the CSI.

With reference to the fourth aspect, in a possible implementation of the fourth aspect, the transceiver is further configured to:

send a correspondence between the first reference signal and a first cell identifier to the terminal.

In an optional implementation, the transceiver may alternatively be configured to send indication information, to indicate the correspondence.

In this embodiment of this application, a method in which the terminal determines that there is the correspondence between the resource used to send the first channel and the first reference signal, and then determines the beam used to send the first channel may be applicable to a scenario in which the terminal obtains a cell identifier.

With reference to the fourth aspect, in a possible implementation of the fourth aspect, the transceiver is further configured to:

send a correspondence between the first reference signal and an UCI type to the terminal.

In an optional implementation, the transceiver may alternatively be configured to send indication information, to indicate the correspondence.

In this embodiment of this application, a method in which the terminal determines that there is the correspondence between the resource used to send the first channel and the first reference signal, and then determines the beam used to send the first channel may be applicable to a scenario in which the terminal receives UCI.

With reference to the fourth aspect, in a possible implementation of the fourth aspect, the transceiver is further configured to:

send, to the terminal, a correspondence between the first reference signal and a resource used to send a channel by the terminal.

In an optional implementation, the transceiver may alternatively be configured to send indication information, to indicate the correspondence.

In this embodiment of this application, a method in which the terminal determines that there is the correspondence between the resource used to send the first channel and the first reference signal, and then determines the beam used to send the first channel may be applicable to a scenario in which the terminal receives the first reference signal.

In a possible design, the foregoing solution implemented by the terminal may be implemented by using a chip.

In a possible design, the foregoing solution implemented by the network device may be implemented by using a chip.

According to a fifth aspect, a computer-readable storage medium is provided, where the computer-readable storage medium stores an instruction. When the instruction is run on a computer, the computer is enabled to perform the methods according to the foregoing aspects.

According to a sixth aspect, a computer program product including an instruction is provided. When the computer program product is run on a computer, the computer is enabled to perform the methods according to the foregoing aspects.

DESCRIPTION OF EMBODIMENTS

The following describes the embodiments of the present application in detail with reference to accompanying drawings. The network architecture and the service scenario described in the embodiments of the present application are intended to describe the technical solutions in the embodiments of the present application more clearly, and do not constitute a limitation on the technical solutions provided in the embodiments of the present application. A person of ordinary skill in the art may know that: With the evolution of the network architecture and the emergence of new service scenarios, the technical solutions provided in the embodiments of the present application are also applicable to similar technical problems.

Figure 1:
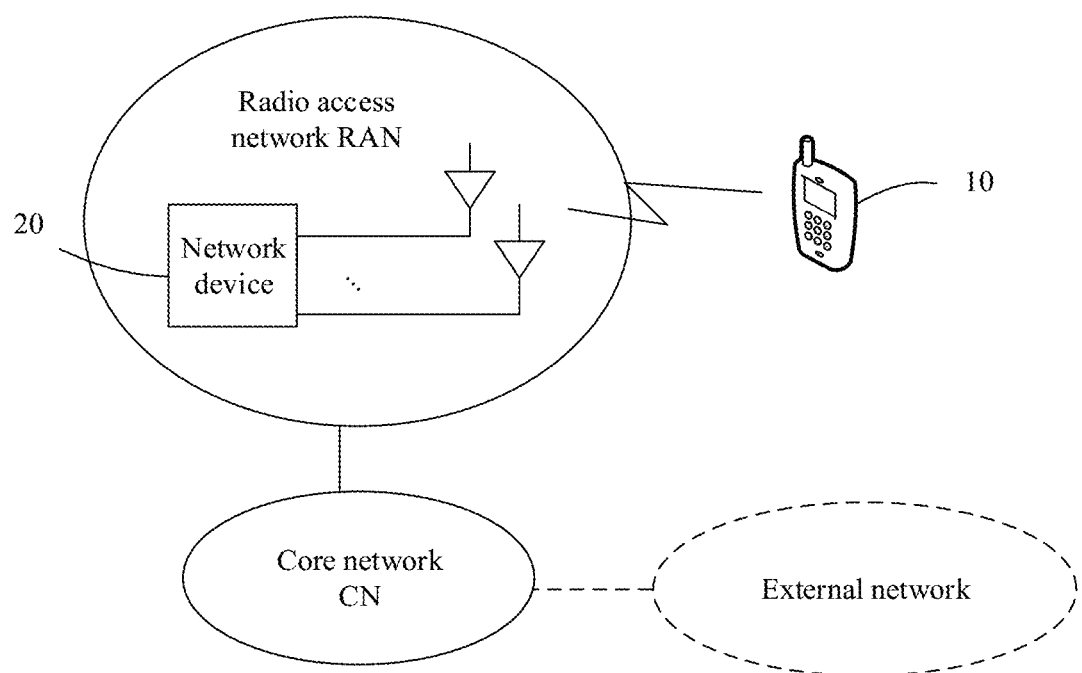
FIG. 1 is a schematic diagram of a possible system network according to this application.

FIG. 1 is a schematic diagram of a possible system network according to this application. As shown in FIG. 1, at least one terminal 10 communicates with a radio access network (RAN). The RAN includes at least one network device 20. For clarity, only one network device and one user equipment (UE) are shown in the figure. The RAN is connected to a core network (CN). Optionally, the CN may be coupled to one or more external networks, such as Internet or a public switched telephone network (PSTN).

To facilitate understanding, the following describes some nouns in this application.

In this application, nouns "network" and "system" are usually interchangeably used, but meanings of the nouns may be understood by a person skilled in the art. User equipment is a terminal device having a communication function, may also be referred to as a terminal, and may include a handheld device, an in-vehicle device, a wearable device, or a computing device that has a wireless communication function, another processing device connected to a wireless modem, or the like. The user equipment may have different names in different networks, for example, a terminal, a mobile station, a subscriber unit, a station, a cellular phone, a personal digital assistant, a wireless modem, a wireless communications device, a handheld device, a laptop computer, a cordless phone, and a wireless local loop station. For ease of description, in this application, these devices are briefly referred to as user equipment or a terminal. A network device may be a device having wireless transmission and reception functions such as a base station (BS), a radio access device in a cloud network, or a relay station. The BS may also be referred to as a BS device, and is a device deployed in a RAN to provide a wireless communication function. The BS may have different names in different radio access systems. For example, the BS is referred to as a NodeB in a universal mobile telecommunications system (UMTS) network, the BS is referred to as an evolved NodeB (eNB or eNodeB) in an LTE network, and the BS may be referred to as a transmission reception point (TRP), a network node, or a g-NodeB (g-Node, gNB) in a future fifth generation (5G) system. In the present application, the network device may be UE or a terminal that has a network device function, or the terminal may be a network device that has a terminal function, or the network device or the terminal device may be a device that has a relay function.

For ease of understanding the embodiments of this application, concepts of spatial QCL and beam reciprocity in the embodiments of this application are briefly described below.

First, a spatial QCL relationship in the embodiments of this application means that signals corresponding to antenna ports of the signals have a same parameter. Alternatively, the spatial QCL relationship means that the terminal may determine, based on a parameter of an antenna port, a parameter of an antenna port that has a spatial QCL relationship with the antenna port. Alternatively, the spatial QCL relationship means that two antenna ports have a same parameter. Alternatively, the spatial QCL relationship means that a parameter difference between two antenna ports is less than a threshold. The parameter may be at least one of delay spread, Doppler spread, a Doppler frequency shift, an average delay, an average gain, an angle of arrival (AOA), an average AOA, AOA spread, an angle of departure (AOD), an average AOD, AOD spread, a receive antenna spatial correlation parameter, a transmit antenna spatial correlation parameter, a transmit beam, a receive beam, and a resource identifier. The beam includes at least one of the following: precoding, a weight sequence number, and a beam sequence number. The angles may be decomposition values at different dimensions or a combination of decomposition values at different dimensions. The antenna ports are antenna ports having different antenna port numbers, and/or antenna ports that have a same antenna port number and that are used to send or receive information at different times, and/or at different frequencies, and/or on different code domain resources, and/or antenna ports that have different antenna port numbers and that are used to send or receive information at different times, and/or at different frequencies, and/or on different code domain resources. The resource identifier includes a resource identifier of a channel state information-reference signal (CSI-RS), or a resource identifier of a sounding reference signal (SRS), or a resource identifier of a synchronization signal/a synchronization signal block, or a resource identifier of a preamble sequence transmitted on a physical random access channel (PRACH), or a resource identifier of a DMRS, and is used to indicate a beam on a resource. For example, a spatial QCL relationship between ports of downlink signals or between ports of uplink signals may mean that the two signals have a same AOA or AOD, and is used to indicate that receive beams or transmit beams are the same. For another example, a QCL relationship between a downlink signal and an uplink signal or between a port of an uplink signal and a port of a downlink signal may be that a correspondence exists between AOAs and AODs of the two signals, or that a correspondence exists between AODs and AOAs of the two signals, that is, an uplink transmit beam may be determined based on a downlink receive beam by using a beam correspondence, or a downlink receive beam may be determined based on an uplink transmit beam by using a beam correspondence.

Signals transmitted on ports having a spatial QCL relationship may also be understood as having a corresponding beam, where the corresponding beam includes at least one of the following: a same receive beam, a same transmit beam, a transmit beam corresponding to a receive beam (corresponding to a reciprocity scenario), and a receive beam corresponding to a transmit beam (corresponding to a reciprocity scenario).

Signals transmitted on ports having a spatial QCL relationship may also be understood as signals received or sent by using a same spatial filter (spatial filter). The spatial filter may include at least one of the following processing processes: precoding, a weight of an antenna port, phase deflection of an antenna port, and an amplitude gain of the antenna port.

Signals transmitted on ports having a spatial QCL relationship may also be understood as having a corresponding beam pair link (BPL), where the corresponding BPL includes at least one of the following: a same downlink BPL, a same uplink BPL, an uplink BPL corresponding to a downlink BPL, and a downlink BPL corresponding to an uplink BPL.

In addition, beam reciprocity may mean that the terminal has a capability of establishing a correspondence between a transmit beam used to transmit an uplink channel and a receive beam of a downlink channel. In other words, in a scenario with beam reciprocity, when the terminal needs to determine a transmit beam of an uplink channel, the terminal may determine, based on beam reciprocity and a receive beam of a downlink channel, the transmit beam used to transmit the uplink channel.

However, in a scenario without beam reciprocity, the terminal cannot determine a transmit beam of an uplink channel based on beam reciprocity and a receive beam used to receive a downlink channel. To resolve the problem that in a scenario without beam reciprocity, a terminal cannot determine a transmit beam used to send an uplink channel, an embodiment of this application provides a communication method.

Figure 2:
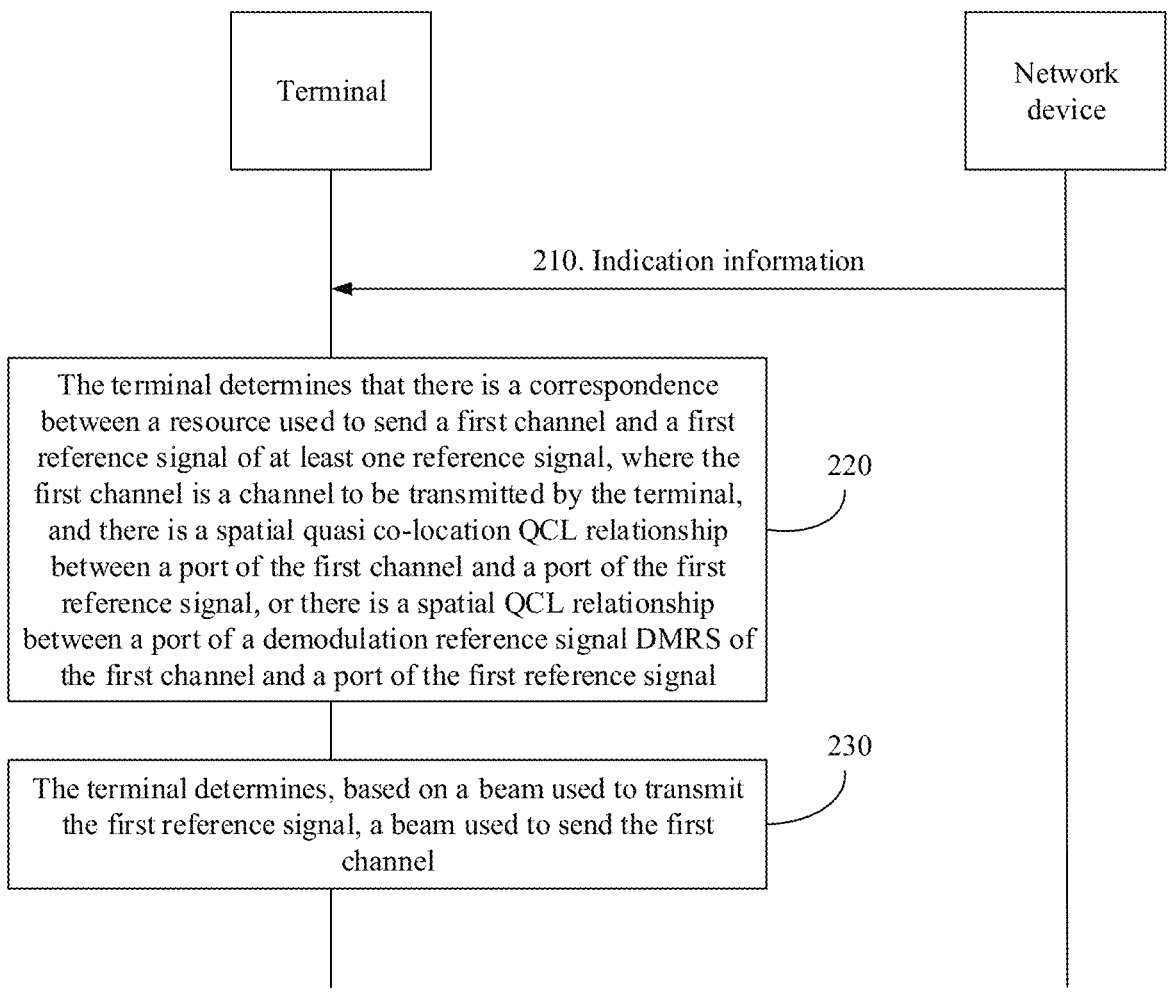
FIG. 2 is a schematic flowchart of a communication method according to an embodiment of this application.

The following describes in detail the communication method in the embodiments of this application with reference to FIG. 2. FIG. 2 is a schematic flowchart of a communication method according to an embodiment of this application. The method shown in FIG. 2 includes the following steps.

210: A terminal receives indication information from a network device, where the indication information includes an identifier of at least one reference signal.

Specifically, the identifier of the reference signal may include an identifier of at least one of the following: a time domain resource used to transmit the reference signal, a frequency domain resource used to transmit the reference signal, a code domain resource used to transmit the reference signal, and a port used to transmit the reference signal.

For example, when the reference signal is a CSI-RS, the identifier of the reference signal may be a channel state information-reference signal resource indicator (CRI) or a port number of the CSI-RS. When the reference signal is an SRS, the identifier of the reference signal may be a sounding reference signal resource indicator (SRI) or a port number of the SRS.

It should be noted that the identifier of the reference signal may also include a plurality of identifiers. For example, when the reference signal is a CSI-RS, the identifier of the reference signal may be a CRI and a CSI-RS port number. When the reference signal is an SRS, the identifier of the reference signal may be an SRI and an SRS port number.

It should be noted that, in addition to the foregoing listed reference signal used in the existing communications system, the reference signal may alternatively be a reference signal in a future communications system that has a same function as the foregoing reference signal. A name of the reference signal is not limited in this embodiment of this application.

220: The terminal determines that there is a correspondence between a resource used to send a first channel and a first reference signal of the at least one reference signal, where the first channel is a channel to be transmitted by the terminal, and there is a spatial QCL relationship between a port of the first channel and a port of the first reference signal, or there is a spatial QCL relationship between a port of a DMRS of the first channel and a port of the first reference signal.

Specifically, the determining, by the terminal, that there is a correspondence between a resource used to send a first channel and a first reference signal of the at least one reference signal may be: determining, by the terminal, the first reference signal that has the correspondence with the resource used to send the first channel.

That there is a spatial QCL relationship between a port of the first channel and a port of the first reference signal, or there is a spatial QCL relationship between a port of a DMRS of the first channel and a port of the first reference signal may mean that a beam used to transmit the first reference signal is the same as a beam used to transmit the first channel or the DMRS of the first channel, or may mean that a beam used to transmit the first reference signal is the same as a spatial filter used to transmit the first channel or the DMRS of the first channel. The spatial filter may alternatively be precoding.

The terminal determines that there is the correspondence between the resource used to send the first channel and the first reference signal of the at least one reference signal. Alternatively, the determining, by the terminal, that there is a correspondence between a resource used to send a first channel and a first reference signal of the at least one reference signal may be understood as: determining, by the terminal, that there is the spatial QCL relationship between the port of the first channel and the port of the first reference signal, or there is a spatial QCL relationship between the port of the DMRS of the first channel and the port of the first reference signal.

Optionally, when the first reference signal is an uplink reference signal, for example, an SRS, a parameter in the QCL relationship includes a transmit-end parameter, for example, includes at least one of an AOD, an average AOD, AOD spread, a transmit antenna spatial correlation parameter, and a transmit beam. The same beam is a same transmit beam, and the same spatial filter is a same transmit-end spatial filter.

Optionally, when the first reference signal is a downlink reference signal, for example, a CSI-RS, a parameter in the QCL relationship includes an end-parameter, for example, includes at least one of an AOA, an average AOA, AOA spread, a receive antenna spatial correlation parameter, and a receive beam, and includes at least one of an AOD, an average AOD, AOD spread, a transmit antenna spatial correlation parameter, and a transmit beam. The same beam is a transmit beam corresponding to a receive beam of the downlink reference signal, and the same spatial filter is a transmit-end spatial filter that is the same as a receive-end spatial filter of the reference signal.

It should be noted that the first channel may be an uplink channel, for example, a physical uplink control channel (PUCCH), a physical uplink shared channel (PUSCH), or an NR-PUCCH.

It should be further understood that the resource used to send the first channel may be any one of the following resources: a time domain resource, a frequency domain resource, and a code domain resource used to send the first channel.

In this embodiment of this application, the terminal may determine, based on the correspondence between the resource used to send the first channel and the reference signal, the reference signal whose port has the spatial QCL relationship with the port of the first channel, and further determine a beam used by the terminal to send the first channel. In the method, the beam used by the terminal to send the first channel is determined based on the correspondence. Therefore, the method may be applicable to a scenario with beam reciprocity and/or a scenario without beam reciprocity.

Optionally, the method further includes:

230. The terminal determines, based on a beam used to transmit the first reference signal, a beam used to send the first channel.

Specifically, the terminal may transmit the first channel or the DMRS of the first channel by using a beam the same as that used to transmit the first reference signal. Alternatively, there is a spatial QCL relationship between the port used by the terminal to transmit the first channel or the DMRS of the first channel and the port of the first reference signal.

Alternatively, the terminal transmits the first channel or the DMRS of the first channel by using a spatial filter the same as that used to transmit the first reference signal.

It should be noted that, in the following embodiments, the reference signal may also be represented by an identifier of the reference signal. For example, the first reference signal may be represented by an identifier of the first reference signal. Optionally, the first reference signal may also be understood as the identifier of the first reference signal.

Optionally, in Embodiment 1, the determining, by the terminal, that there is a correspondence between a resource used to send a first channel and a first reference signal of the at least one reference signal, or the determining, by the terminal, that there is a correspondence between the first channel and the first reference signal of the at least one reference signal includes:

determining, by the terminal based on a correspondence between the first reference signal and a time-frequency resource used to transmit a second channel and a correspondence between the resource used to transmit the second channel and the resource used to send the first channel, that there is a correspondence between the resource used to send the first channel and the first reference signal, where the second channel is a channel used to transmit DCI.

Specifically, the time-frequency resource of the second channel may be a control resource set (CORESET), or a search space, or a CORESET set, or a set of search spaces, or may be identifiers thereof.

It should be noted that the correspondence between the first reference signal and the time-frequency resource used to transmit the second channel may also be a correspondence between the identifier of the first reference signal and the time-frequency resource used to transmit the second channel, and may be configured by the network device or predefined in a protocol. That the network device performs configuration may mean that the network device may perform configuration by using higher layer signaling and/or DCI. The higher layer signaling includes radio resource control (RRC) signaling or multimedia access control control element (MAC CE) signaling. The predefining in a protocol may mean that the correspondence between the identifier of the first reference signal and the time-frequency resource of the second channel is specified in a communications protocol. In this way, the network device may configure correspondences between different first reference signals and identifiers of the first reference signals, to configure correspondences between different first reference signals and time-frequency resources of the second channel. For example, the identifier of the first reference signal may be a BPL. Optionally, the first reference signal in this embodiment may also be replaced with the identifier of the first reference signal.

It should be noted that, the correspondence between the first reference signal and the time-frequency resource used to transmit the second channel or the correspondence between the identifier of the first reference signal and the time-frequency resource used to transmit the second channel may be obtained as follows: The network device configures or a protocol predefines that a first reference signal or an identifier of the first reference signal corresponds to a time-frequency resource of the second channel. Alternatively, the network device may configure a reference signal or an identifier of a reference signal for a time-frequency resource of the second channel. Alternatively, a protocol predefines a reference signal or an identifier of a reference signal for a time-frequency resource of the second channel.

It should be noted that the second channel is a channel used to transmit DCI, and may be a physical downlink control channel (PDCCH) or an NR-PDCCH in an existing communications system, or may be a channel in a future communications system that has a same function as that of a PDCCH.

For example, the first channel is a PUCCH, the second channel is a PDCCH, and the PUCCH carries acknowledgment (ACK) information or negative acknowledgment (NACK) information used to indicate whether the PDCCH is received by the terminal. In this case, there is a correspondence between a time-frequency resource used to transmit the PUCCH and a time-frequency resource used to transmit the PDCCH, and the correspondence may be predefined or indicated by the network device. The network device may indicate the correspondence in DCI on a PDCCH. Based on the correspondence between the first reference signal and the time-frequency resource used to transmit the PDCCH and a correspondence between the time-frequency resource used to transmit the PUCCH and the time-frequency resource used to transmit the PDCCH, the terminal may determine that there is a correspondence between the resource used to transmit the PUCCH and the first reference signal, that is, determines the first reference signal that has the correspondence with the resource used to transmit the PUCCH. Therefore, the terminal may determine that the PUCCH or a DMRS of the PUCCH and the port of the first reference signal have a spatial QCL relationship, a same beam, or a same spatial filter.

It should be noted that the time-frequency resource of the PDCCH may be a CORESET, or a search space, or a CORESET set, or a set of search spaces, or may be identifiers thereof.

In this embodiment of this application, the method in which the terminal determines that there is the correspondence between the resource used to send the first channel and the first reference signal, or determines that there is the correspondence between the first channel and the first reference signal of the at least one reference signal, and then determines the beam used to send the first channel may be applicable to a scenario in which the terminal receives a downlink PDCCH.

Optionally, in Embodiment 2, the determining, by the terminal, that there is a correspondence between a resource used to send a first channel and a first reference signal of the at least one reference signal includes: determining, by the terminal based on a correspondence between the first reference signal and a reporting configuration of a reference signal used to measure CSI, and the resource that is of the first channel and that is configured in the reporting configuration of the reference signal used to measure the CSI, that there is the correspondence between the resource used to send the first channel and the first reference signal.

It should be noted that the correspondence between the first reference signal and the reporting configuration of the reference signal used to measure the CSI may also be a correspondence between the identifier of the first reference signal and the reporting configuration of the reference signal used to measure the CSI or an identifier of the reporting configuration, and may be configured by the network device or predefined in a protocol. That the network device performs configuration may mean that the network device may perform configuration by using higher layer signaling and/or DCI. The higher layer signaling includes RRC signaling or MAC CE signaling. The predefining in a protocol may mean that the correspondence between the identifier of the first reference signal and the reporting configuration of the reference signal used to measure the CSI or the identifier of the reporting configuration is specified in a communications protocol. In this way, the network device may configure correspondences between different first reference signals and identifiers of the first reference signals, to configure correspondences between different first reference signals and the reporting configuration of the reference signal used to measure the CSI or the identifier of the reporting configuration. For example, the identifier of the first reference signal may be a BPL. Optionally, the first reference signal in this embodiment may also be replaced with the identifier of the first reference signal.

It should be noted that the correspondence between the first reference signal and the reporting configuration of the reference signal used to measure the CSI or the identifier of the reporting configuration, or the correspondence between the identifier of the first reference signal and the reporting configuration of the reference signal used to measure the CSI or the identifier of the reporting configuration may be obtained as follows: The network device configures or a protocol predefines that a first reference signal or an identifier of the first reference signal corresponds to a reporting configuration of a reference signal used to measure CSI or an identifier of the reporting configuration. Alternatively, the network device configures a reference signal or an identifier of a reference signal for a reporting configuration of a reference signal used to measure CSI or an identifier of the reporting configuration. Alternatively, a protocol predefines a reference signal or an identifier of a reference signal for a reporting configuration of a reference signal used to measure CSI or an identifier of the reporting configuration.

Specifically, information about the reporting configuration of the reference signal used to measure the CSI may be used to indicate a time-frequency resource used by the terminal to report the measured CSI, for example, used to indicate a time-frequency resource that is used by the terminal to report the measured CSI and that is of the first channel.

For example, the information about the reporting configuration of the reference signal used to measure the CSI is a CSI-RS reporting configuration (CSI-RS resource setting), and the first channel is a PUCCH. In this case, a resource used to transmit the PUCCH is indicated by the CSI-RS reporting configuration. Optionally, the PUCCH is used to transmit reporting information obtained based on CSI-RS measurement. The terminal may determine, based on a correspondence between the first reference signal and the CSI-RS reporting configuration and a PUCCH resource indicated by the CSI-RS reporting configuration, that there is a correspondence between the resource used to transmit the PUCCH and the first reference signal, that is, determine the first reference signal having a correspondence with the resource used to transmit the PUCCH. Therefore, the terminal may determine that the port of the PUCCH or the port of the DMRS of the PUCCH and the port of the first reference signal have a spatial QCL relationship, a same beam, or a same spatial filter.

In this embodiment of this application, a method in which the terminal determines that there is the correspondence between the resource used to send the first channel and the first reference signal, and then determines the beam used to send the first channel may be applicable to a scenario in which the terminal receives reporting configuration information of the reference signal used to measure the CSI.

Optionally, in Embodiment 3, the determining, by the terminal, that there is a correspondence between a resource used to send a first channel and a first reference signal of the at least one reference signal, or the determining, by the terminal, that there is a correspondence between the first channel and the first reference signal of the at least one reference signal includes: determining, by the terminal based on a correspondence between the first reference signal and a first cell identifier and a correspondence between the first cell identifier and the resource used to send the first channel, that there is the correspondence between the resource used to send the first channel and the first reference signal.

Specifically, the cell identifier may be a physical cell identifier, or is related to a DCI scrambling parameter. The cell identifier may be carried in DCI.

It should be noted that the cell identifier may be further used to distinguish some cells. For example, the cell identifier is a value of 2 bits, and four cells may be distinguished.

It should be noted that the correspondence between the first reference signal and the cell identifier may also be a correspondence between the identifier of the first reference signal and the cell identifier, and may be configured by the network device or predefined in a protocol. That the network device performs configuration may mean that the network device may perform configuration by using higher layer signaling and/or DCI. The higher layer signaling includes RRC signaling or MAC CE signaling. The predefining in a protocol may mean that the correspondence between the identifier of the first reference signal and the cell identifier is specified in a communications protocol. In this way, the network device may configure correspondences between different first reference signals and identifiers of the first reference signals, to configure correspondences between different first reference signals and cell identifiers. For example, the identifier of the first reference signal may be a BPL. Optionally, the first reference signal in this embodiment may also be replaced with the identifier of the first reference signal.

It should be noted that, the correspondence between the first reference signal and the cell identifier or the correspondence between the identifier of the first reference signal and the cell identifier may be obtained as follows: The network device configures or a protocol predefines that a first reference signal or an identifier of the first reference signal corresponds to a cell identifier. Alternatively, the network device may configure a reference signal or an identifier of a reference signal for a cell identifier. Alternatively, a protocol predefines a reference signal or an identifier of a reference signal for a cell identifier.

For example, the cell identifier is carried in the DCI, and the first channel may be a PUCCH. In this case, the terminal may determine, based on a correspondence between the first reference signal and a first cell identifier and a correspondence between the first cell identifier and the resource used to send the PUCCH, that there is the correspondence between the resource used to send the PUCCH and the first reference signal.

In this embodiment of this application, a method in which the terminal determines that there is the correspondence between the resource used to send the first channel and the first reference signal, and then determines the beam used to send the first channel may be applicable to a scenario in which the terminal obtains a cell identifier.

Optionally, in Embodiment 4, the determining, by the terminal, that there is a correspondence between a resource used to send a first channel and a first reference signal of the at least one reference signal, or the determining, by the terminal, that there is a correspondence between the first channel and the first reference signal of the at least one reference signal includes: determining, by the terminal based on a correspondence between the first reference signal and an UCI type and a correspondence between the UCI type carried on the first channel and the resource used to send the first channel, that there is the correspondence between the resource used to send the first channel and the first reference signal.

Specifically, the UCI type may be determined based on content carried in the UCI. In other words, different types of UCI carry different content. The content carried in the UCI may include at least one of the following information: ACK information used to indicate that a downlink shared channel is received, CSI, a scheduling request, and a beam interruption reset request.

There is a correspondence between the resource used to send the first channel and the first reference signal. Alternatively, there is a correspondence between the resource of the first channel and the first reference signal.

It should be noted that the correspondence between the first reference signal and the UCI type may also be a correspondence between the identifier of the first reference signal and the UCI type, and may be configured by the network device or predefined in a protocol. That the network device performs configuration may mean that the network device may perform configuration by using higher layer signaling and/or DCI. The higher layer signaling includes RRC signaling or MAC CE signaling. The predefining in a protocol may mean that the correspondence between the identifier of the first reference signal and the UCI type is specified in a communications protocol. In this way, the network device may configure correspondences between different first reference signals and identifiers of the first reference signals, to configure correspondences between different first reference signals and UCI types. For example, the identifier of the first reference signal may be a BPL. Optionally, the first reference signal in this embodiment may also be replaced with the identifier of the first reference signal.

It should be noted that, the correspondence between the first reference signal and the UCI type or the correspondence between the identifier of the first reference signal and the UCI type may be obtained as follows: The network device configures or a protocol predefines that a first reference signal or an identifier of the first reference signal corresponds to an UCI type. Alternatively, the network device may configure a reference signal or an identifier of a reference signal for an UCI type. Alternatively, a protocol predefines a reference signal or an identifier of a reference signal for an UCI type.

For example, the control information type is a scheduling request, and the first channel is a PUCCH. In this case, the terminal may determine, based on a correspondence between the first reference signal and UCI and a correspondence between an UCI type carried on the PUCCH and the resource used to send the PUCCH, that there is the correspondence between the resource used to send the PUCCH and the first reference signal.

In this embodiment of this application, a method in which the terminal determines that there is the correspondence between the resource used to send the first channel and the first reference signal, and then determines the beam used to send the first channel may be applicable to a scenario in which the terminal needs to send UCI.

Optionally, in Embodiment 5, the determining, by the terminal, that there is a correspondence between a resource used to send a first channel and a first reference signal of the at least one reference signal, or the determining, by the terminal, that there is a correspondence between the first channel and the first reference signal of the at least one reference signal includes: determining, by the terminal based on the resource used to send the first channel and a correspondence between the first reference signal and the resource used by the terminal to send the channel, that there is the correspondence between the resource used to send the first channel and the first reference signal.

Specifically, the correspondence between the first reference signal and the resource used by the terminal to send the channel may mean that the resource used by the terminal to transmit the channel is divided into at least one resource group, and each of the at least one resource group may correspond to a reference signal.

It should be noted that the correspondence between the first reference signal and the resource used by the terminal to send the channel may also be a correspondence between the identifier of the first reference signal and the resource used by the terminal to send the channel, and may be configured by the network device or predefined in a protocol. That the network device performs configuration may mean that the network device may perform configuration by using higher layer signaling and/or DCI. The higher layer signaling includes RRC signaling or MAC CE signaling. The predefining in a protocol may mean that the correspondence between the identifier of the first reference signal and the resource used by the terminal to send the channel is specified in a communications protocol. In this way, the network device may configure correspondences between different first reference signals and identifiers of the first reference signals, to configure correspondences between different first reference signals and resources used by the terminal to send the channel. For example, the identifier of the first reference signal may be a BPL. Optionally, the first reference signal in this embodiment may also be replaced with the identifier of the first reference signal.

It should be noted that, the correspondence between the first reference signal and the resource used by the terminal to send the channel or the correspondence between the identifier of the first reference signal and the resource used by the terminal to send the channel may be obtained as follows: The network device configures or a protocol predefines that a first reference signal or an identifier of the first reference signal corresponds to a resource used by the terminal to send the channel. Alternatively, the network device may configure a reference signal or an identifier of a reference signal for a resource used by the terminal to send the channel. Alternatively, a protocol predefines a reference signal or an identifier of a reference signal for a resource used by the terminal to send the channel.

For example, the first channel is a PUCCH. The terminal determines, based on the resource used to send the PUCCH and a correspondence between the first reference signal and a resource used to send a channel by the terminal, that there is the correspondence between the resource used to send the PUCCH and the first reference signal.

In this embodiment of this application, a method in which the terminal determines that there is the correspondence between the resource used to send the first channel and the first reference signal, and then determines the beam used to send the first channel may be applicable to a scenario in which the terminal receives the first reference signal.

Optionally, this embodiment may be used in combination with the foregoing embodiment. For example, when the control information type includes a scheduling request or a beam reset request, and the first channel is a PUCCH, the network device may directly configure, for the terminal, a beam used to transmit the scheduling request or the beam interruption reset request. That is, the network device may directly indicate, to the terminal, the first reference signal corresponding to the scheduling request or the beam reset request.

It should be noted that the foregoing embodiments may be applicable to different scenarios, and the methods shown in the foregoing embodiments may be combined with each other. This is not specifically limited in the embodiments of this application.

Optionally, in an embodiment, the terminal determines, based on an UCI type carried on the to-be-transmitted first channel and a priority of the UCI type, that there is a correspondence between the resource of the to-be-transmitted first channel and the first reference signal of the at least one reference signal.

The method further includes:

determining, by the terminal, an UCI type with a highest priority that is carried on the to-be-transmitted first channel; and determining, by the terminal, the first reference signal of the at least one reference signal based on the UCI type with the highest priority.

Specifically, the terminal may determine the first reference signal of the at least one reference signal in the manner in one or more of the foregoing embodiments based on the UCI type with the highest priority.

For example, when the UCI type with the highest priority is ACK information of a downlink shared channel, the first reference signal may be determined based on the method in at least one of Embodiments 1, 3, 4, and 5. When the UCI type with the highest priority is CSI, the first reference signal may be determined based on the method in at least one of Embodiments 2, 3, 4, and 5. When the UCI type with the highest priority is scheduling request information or beam interruption reset request information, the first reference signal may be determined based on the method in at least one of Embodiments 3, 4, and 5.

Specifically, when the UCI carries multiple types of content, a content type with a highest priority may be determined based on priorities of the foregoing content, and then it is determined, based on a correspondence between the content type with the highest priority and the resource used to send the first channel, that there is a correspondence between the resource used to send the first channel and the first reference signal.

It should be noted that the priority of the UCI type may be preconfigured by the network device for the terminal, or may be agreed on in a communications protocol.

For example, when the UCI carries CSI and ACK information that is used to indicate that a downlink shared channel is received, and a priority of the ACK information that is used to indicate that the downlink shared channel is received is higher than a priority of the CSI, the terminal may determine, based on the correspondence between the first reference signal and the ACKt information that is used to indicate that the downlink shared channel is received, and the correspondence between the ACK information that is used to indicate that the downlink shared channel is received and the resource used to send the first channel, that there is a correspondence between the resource used to send the first channel and the first reference signal, that is, determine the first reference signal having a correspondence with the resource used to transmit the first channel. Therefore, the terminal may determine that the port of the first channel or the DMRS of the first channel and the port of the first reference signal have a spatial QCL relationship, a same beam, or a same spatial filter. For example, the first channel may be a PUCCH.

For another example, the priorities further include at least one of the following: a priority of ACK information of a downlink shared channel is higher than that of a scheduling request, a priority of ACK information of a downlink shared channel is higher than that of beam interruption reset request information, and a priority of CSI is higher than that of beam interruption reset request information, a priority of the CSI is higher than that of the scheduling request information, and the priority of the scheduling request information is higher than that of the beam interruption reset request information. There may also be other priorities.

Optionally, in an embodiment, the method further includes: receiving, by the terminal, configuration information sent by the network device, where the configuration information is used to instruct the terminal to determine a valid time of the first reference signal based on the indication information.

Specifically, the valid time includes a validation time, or a validation time and an invalidation time. The validation time and the invalidation time may be a time interval from a first time unit used to transmit the configuration information, and the time interval may be represented by a quantity of second time units. The first time unit may be a slot, a symbol, a mini-slot, or a subframe. The second time unit may be a slot, a symbol, a mini-slot, or a subframe.

Optionally, the invalidation time may alternatively be represented by a time interval between the invalidation time and the validation time.

It should be understood that, in the foregoing embodiment, the configuration information sent by the network device to the terminal may be carried in various types of signaling, for example, MAC CE signaling, RRC signaling, DCI, a system message, or a broadcast message. Alternatively, a combination of the foregoing various types of signaling may be used. For example, the network device may configure a configuration information candidate set for the terminal by using RRC signaling, and indicate target configuration information in the configuration information set by using DCI. Alternatively, the network device may configure a configuration information candidate set for the terminal by using RRC signaling, then indicate a currently available configuration information subset in the configuration information candidate set to the terminal by using a MAC CE, and finally indicate target configuration information in the configuration information subset to the terminal by using DCI.

It should be noted that the information sent by the network device includes indication information and configuration information, the indication information may include first downlink indication information or second downlink indication information, and the configuration information includes other configuration information that needs to be configured by the network device. Different information may be carried in different manners. This is not specifically limited in this embodiment of this application. Optionally, when the indication information is carried in signaling other than the DCI, the indication information may further carry the validation time and/or the invalidation time of the indication information.

For example, the first time unit is a slot, the second time unit is a slot, and the terminal receives the configuration information in a slot n. The configuration information indicates that validation occurs after four slots and invalidation occurs after eight slots, or indicates that validation occurs after four slots and invalidation occurs fours slots after validation. In this case, the validation time determined by using the configuration information is from an $(n+4)^{th}$ slot to an $(n+8)^{th}$ slot.

It should be noted that the foregoing described plurality of solutions may be separately or jointly used.

The embodiments of the present application further provide apparatus embodiments for implementing steps and methods in the foregoing method embodiments. The methods, steps, technical details, technical effects, and the like in the foregoing method embodiments are also applicable to the apparatus embodiments, and details are not described below again.

Figure 3:
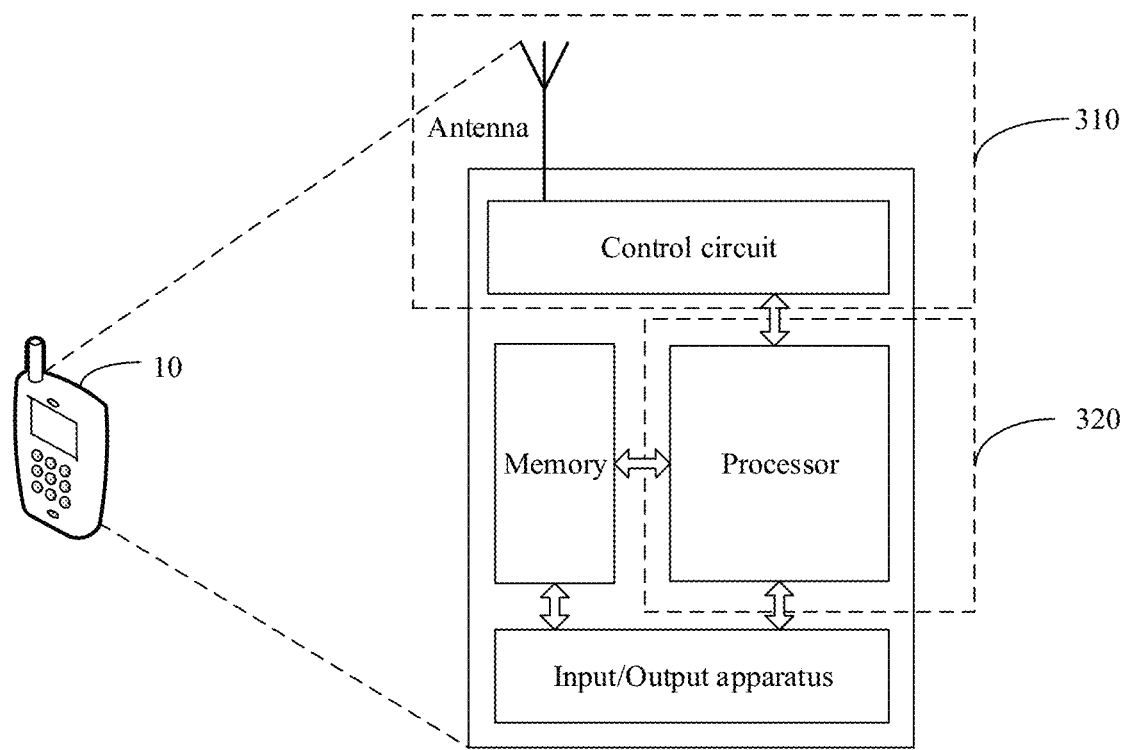
FIG. 3 is a schematic structural diagram of a terminal.

FIG. 3 is a schematic structural diagram of a terminal. The terminal is applicable to the system shown in FIG. 1. For ease of description, FIG. 3 shows only main components of the terminal. As shown in FIG. 3, the terminal 10 includes a processor, a memory, a control circuit or an antenna, and an input/output apparatus. The processor is mainly configured to: process a communication protocol and communication data, control the entire terminal, execute a software program, and process data of the software program. The memory is mainly configured to store a software program and data, for example, store a codebook described in the foregoing embodiment. The control circuit is mainly configured to perform conversion between a baseband signal and a radio frequency signal, and process the radio frequency signal. A combination of the control circuit and the antenna may also be referred to as a transceiver that is mainly configured to send and receive a radio frequency signal in an electromagnetic wave form. The input/output apparatus, such as a touchscreen, a display, or a keyboard, is mainly configured to: receive data entered by a user, and output data to the user.

After the terminal is powered on, the processor may read the software program from the storage unit, interpret and execute an instruction of the software program, and process the data of the software program. When data needs to be sent in a wireless manner, the processor performs baseband processing on the to-be-sent data, and outputs a baseband signal to a radio frequency circuit. After performing radio frequency processing on the baseband signal, the radio frequency circuit sends a radio frequency signal in the electromagnetic wave form by using the antenna. When data is sent to the terminal, the radio frequency circuit receives the radio frequency signal through the antenna, converts the radio frequency signal into a baseband signal, and outputs the baseband signal to the processor. The processor converts the baseband signal into data, and processes the data.

A person skilled in the art may understand that, for ease of description, FIG. 3 shows only one memory and one processor. Actually, the terminal may include a plurality of processors and a plurality of memories. The memory may also be referred to as a storage medium, a storage device, or the like. This is not limited in this embodiment of the present application.

In an optional implementation, the processor may include a baseband processor and a central processing unit (CPU). The baseband processor is mainly configured to process a communication protocol and communication data, and the CPU is mainly configured to: control the entire terminal, execute a software program, and process data of the software program. The processor in FIG. 3 integrates functions of the baseband processor and the CPU. A person skilled in the art may understand that the baseband processor and the CPU may be independent processors, and are interconnected by using a technology such as a bus. A person skilled in the art may understand that the terminal may include a plurality of baseband processors to adapt to different network standards, and the terminal may include a plurality of CPUs to enhance a processing capability of the terminal. The components in the terminal may be connected by using various buses. The baseband processor may also be expressed as a baseband processing circuit or a baseband processing chip. The CPU may also be expressed as a central processing circuit or a central processing chip. A function of processing the communication protocol and the communication data may be built in the processor, or may be stored in the storage unit in a form of a software program. The processor executes the software program to implement a baseband processing function.

For example, in this embodiment of the present application, the antenna and the control circuit that have transmission and reception functions may be considered as a transceiver unit 310 of the terminal 10, and the processor having a processing function may be considered as a processing unit 320 of the terminal 10. As shown in FIG. 3, the terminal 10 includes the transceiver unit 310 and the processing unit 320. The transceiver unit may also be referred to as a transceiver, a transceiver machine, a transceiver apparatus, or the like. Optionally, a component that is in the transceiver unit 310 and that is configured to implement a reception function may be considered as a receiving unit, and a component that is in the transceiver unit 310 and that is configured to implement a transmission function may be considered as a sending unit. In other words, the transceiver unit 310 includes the receiving unit and the sending unit. For example, the receiving unit may also be referred to as a receiver machine, a receiver, a receiver circuit, or the like; and the sending unit may be referred to as a transmitter machine, a transmitter, a transmitter circuit, or the like.

The terminal may be configured to implement the method in the foregoing method embodiments, and details are as follows:

the transceiver is configured to receive indication information from a network device, where the indication information includes an identifier of at least one reference signal; and the processor is configured to determine that there is a correspondence between a resource used to send a first channel and a first reference signal of the at least one reference signal, where the first channel is a channel to be transmitted by the terminal, and there is a spatial QCL relationship between a port of the first channel and a port of the first reference signal, or there is a spatial QCL relationship between a port of a DMRS of the first channel and a port of the first reference signal.

In this embodiment of this application, the terminal may determine, based on the correspondence between the resource used to send the first channel and the reference signal, the reference signal whose port has the spatial QCL relationship with the port of the first channel, and further determine a beam used by the terminal to send the first channel. In the method, the beam used by the terminal to send the first channel is determined based on the correspondence. Therefore, the method may be applicable to a scenario with beam reciprocity and/or a scenario without beam reciprocity.

Figure 4:
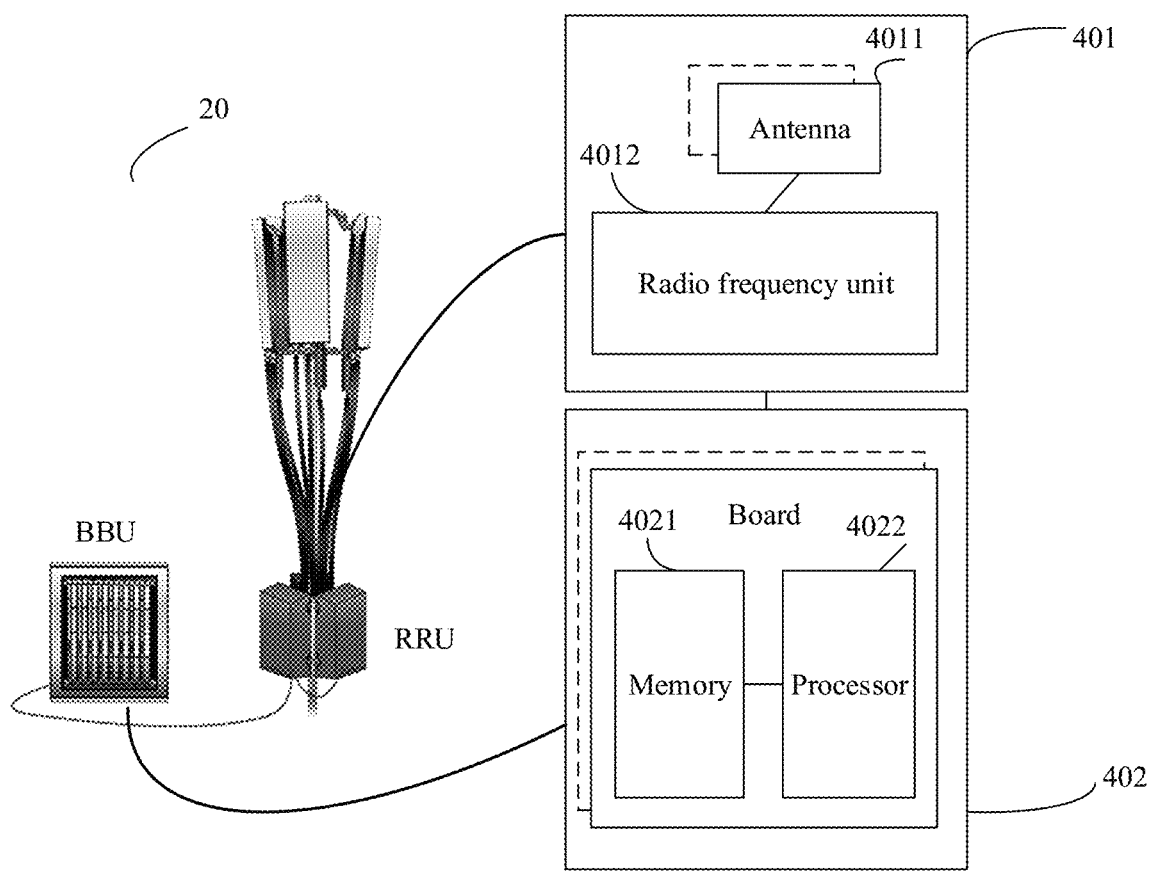
FIG. 4 is a schematic structural diagram of a network device.

FIG. 4 is a schematic structural diagram of a network device. The network device may be applied to the system shown in FIG. 1. The network device 20 includes one or more remote radio units (RRUs) 401 and one or more baseband units (BBUs) 402. The RRU 401 may be referred to as a transceiver unit, a transceiver machine, a transceiver circuit, a transceiver, or the like, and may include at least one antenna 4011 and a radio frequency unit 4012. The RRU 401 is mainly configured to: send/receive a radio frequency signal, and perform conversion between the radio frequency signal and a baseband signal, for example, configured to send a signaling indication or the reference signal in the foregoing embodiments to a terminal. The BBU 402 is mainly configured to: perform baseband processing, control the network device, and the like. The RRU 401 and the BBU 402 may be physically disposed together, or may be physically disposed separately, that is, a distributed BS.

The BBU 402 is a control center of the network device, or may be referred to as a processing unit, and is mainly configured to complete baseband processing functions such as channel coding, multiplexing, modulation, and spectrum spreading. In an example, the BBU 402 may include one or more boards, and a plurality of boards may jointly support a RAN (such as a 5G network) in a single access standard, or may separately support RANs in different access standards. The BBU 402 further includes a memory 4021 and a processor 4022. The memory 4021 is configured to store a necessary instruction and necessary data. The processor 4022 is configured to control the network device to perform a necessary action. The memory 4021 and the processor 4022 may serve one or more boards. In other words, a memory and a processor may be separately disposed on each board. Alternatively, a plurality of boards may share a same memory and a same processor. In addition, a necessary circuit is further disposed on each board.

The network device may be configured to implement the method in the foregoing method embodiments, and details are as follows:

the processor is configured to generate indication information, where the indication information includes an identifier of at least one reference signal; and the transceiver is configured to send the indication information to a terminal, so that the terminal determines that there is a correspondence between a resource used to send a first channel and a first reference signal of the at least one reference signal, where the first channel is a channel to be transmitted by the terminal, and there is a spatial QCL relationship between a port of the first channel and a port of the first reference signal, or there is a spatial QCL relationship between a port of a DMRS of the first channel and a port of the first reference signal.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present application are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid state disk solid state disk (SSD)), or the like.

What is claimed is:

1. A communication method, comprising:

receiving, by a terminal, indication information from a network device, wherein the indication information comprises an identifier of at least one reference signal; and determining, by the terminal, that there is a correspondence between a resource used to send a signal on a first channel and a first reference signal of the at least one reference signal, wherein the first channel is a channel on which the signal is to be transmitted by the terminal, and wherein:

a spatial filter used to transmit the signal on the first channel is the same as a spatial filter used to transmit the first reference signal, or a spatial filter used to transmit a demodulation reference signal of the first channel is the same as a spatial filter used to transmit the first reference signal, wherein the determining, by the terminal, that there is a correspondence between the resource used to send the signal on the first channel and the first reference signal of the at least one reference signal comprises determining, by the terminal, based on a correspondence between the first reference signal and a first cell identifier that is received by the terminal and a correspondence between the first cell identifier and the resource used to send the signal on the first channel.

2. The method according to claim 1, wherein the determining, by the terminal, that there is a correspondence between the resource used to send the signal on the first channel and the first reference signal of the at least one reference signal comprises:

determining, by the terminal based on a correspondence between the first reference signal and a time-frequency resource used to transmit a second signal on a second channel and a correspondence between the resource used to transmit the second signal on the second channel and the resource used to send the signal on the first channel, that there is a correspondence between the resource used to send the signal on the first channel and the first reference signal, wherein the second channel is a channel used to transmit downlink control information.

3. The method according to claim 1, wherein the determining, by the terminal, that there is a correspondence between the resource used to send the signal on the first channel and the first reference signal of the at least one reference signal comprises:

determining, by the terminal based on a correspondence between the first reference signal and a reporting configuration of a reference signal used to measure channel state information, and the resource that is of the first channel and that is configured in the reporting configuration of the reference signal used to measure the channel state information, that there is the correspondence between the resource used to send the signal on the first channel and the first reference signal.

4. The method according to claim 1, wherein the determining, by the terminal, that there is a correspondence between the resource used to send the signal on the first channel and the first reference signal of the at least one reference signal comprises:
  determining, by the terminal based on a correspondence between the first reference signal and an uplink control information type and a correspondence between an uplink control information type carried on the first channel and the resource used to send the signal on the first channel, that there is the correspondence between the resource used to send the signal on the first channel and the first reference signal.

5. The method according to claim 1, wherein the determining, by the terminal, that there is a correspondence between the resource used to send the signal on the first channel and the first reference signal of the at least one reference signal comprises:
  determining, by the terminal based on the resource used to send the signal on the first channel and a correspondence between the first reference signal and a resource used by the terminal to send a signal on a channel, that there is the correspondence between the resource used to send the signal on the first channel and the first reference signal.

6. A terminal, comprising:
  a transceiver, configured to receive indication information from a network device, wherein the indication information comprises an identifier of at least one reference signal; and
  a processor, configured to determine that there is a correspondence between a resource used to send a signal on a first channel and a first reference signal of the at least one reference signal, wherein the first channel is a channel on which the signal is to be transmitted by the terminal, and wherein:
  a spatial filter used to transmit the signal on the first channel is the same as a spatial filter used to transmit the first reference signal,
  or
  a spatial filter used to transmit a demodulation reference signal of the first channel is the same as a spatial filter used to transmit the first reference signal,
  wherein the determining that there is a correspondence between the resource used to send the signal on the first channel and the first reference signal of the at least one reference signal comprises determining based on a correspondence between the first reference signal and a first cell identifier that is received by the terminal and a correspondence between the first cell identifier and the resource used to send the signal on the first channel.

7. The terminal according to claim 6, wherein the processor is further configured to:
  determine, based on a correspondence between the first reference signal and a time-frequency resource used to transmit a second signal on a second channel and a correspondence between the resource used to transmit the second signal on the second channel and the resource used to send the signal on the first channel, that there is a correspondence between the resource used to send the signal on the first channel and the first reference signal, wherein the second channel is a channel used to transmit downlink control information.

8. The terminal according to claim 6, wherein the processor is further configured to:
  determine, based on a correspondence between the first reference signal and a reporting configuration of a reference signal used to measure channel state information, and the resource that is of the first channel and that is configured in the reporting configuration of the reference signal used to measure the channel state information, that there is the correspondence between the resource used to send the signal on the first channel and the first reference signal.

9. The terminal according to claim 6, wherein the processor is further configured to:
  determine, based on a correspondence between the first reference signal and an uplink control information type and a correspondence between an uplink control information type carried on the first channel and the resource used to send the signal on the first channel, that there is the correspondence between the resource used to send the signal on the first channel and the first reference signal.

10. The terminal according to claim 6, wherein the processor is further configured to:
  determine, based on the resource used to send the signal on the first channel and a correspondence between the first reference signal and a resource used by the terminal to send a signal on a channel, that there is the correspondence between the resource used to send the signal on the first channel and the first reference signal.

11. A network device, comprising:
  a processor, configured to generate indication information, wherein the indication information comprises an identifier of at least one reference signal; and
  a transceiver, configured to send the indication information to a terminal, so that the terminal determines that there is a correspondence between a resource used to send a signal on a first channel and a first reference signal of the at least one reference signal, and configured to send a correspondence between the first reference signal and a first cell identifier to the terminal,
  wherein the first channel is a channel on which the signal is to be transmitted by the terminal, and wherein:
  a spatial filter used to transmit the signal on the first channel is the same as a spatial filter used to transmit the first reference signal,
  or
  a spatial filter used to transmit a demodulation reference signal of the first channel is the same as a spatial filter used to transmit the first reference signal.

12. The network device according to claim 11, wherein the transceiver is further configured to:
  send, to the terminal, a correspondence between the first reference signal and a time-frequency resource used to transmit a second signal on a second channel, wherein the second channel is a channel used to transmit downlink control information.

13. The network device according to claim 11, wherein the transceiver is further configured to:
  send, to the terminal, a correspondence between the first reference signal and a reporting configuration of a reference signal used to measure channel state information.

14. The network device according to claim 11, wherein the transceiver is further configured to:
  send, to the terminal, a correspondence between the first reference signal and an uplink control information type.

15. The network device according to claim 11, wherein the transceiver is further configured to:

send, to the terminal, a correspondence between the first reference signal and a resource used by the terminal to send a signal on a channel.

* * * * *